United States Patent [19]
Smith et al.

[11] 3,755,680
[45] Aug. 28, 1973

[54] FLAME COLOR SIGNATURE APPARATUS

[75] Inventors: Chester L. Smith, Lake Hopatcong; Louis R. Szabo, Landing, both of N.J.

[73] Assignee: The United States of America as represented by the Secretary of the Army, Washington, D.C.

[22] Filed: Sept. 10, 1971

[21] Appl. No.: 179,345

[52] U.S. Cl. .............................. 250/226, 356/178
[51] Int. Cl. .............................................. G01j 3/34
[58] Field of Search .................... 250/226; 356/45, 356/177, 178

[56] References Cited
UNITED STATES PATENTS

| | | | |
|---|---|---|---|
| 3,547,541 | 12/1970 | Varnela | 250/226 |
| 3,330,904 | 7/1967 | Gebel | 356/177 |
| 3,060,790 | 10/1962 | Ward | 250/226 |
| 3,373,870 | 3/1968 | Black | 356/178 |
| 3,645,633 | 2/1972 | Kisatsky | 356/177 |
| 3,531,208 | 9/1970 | Ward | 356/177 |
| 3,522,739 | 8/1970 | Coor | 356/178 |
| 3,572,944 | 3/1971 | Hanline | 356/177 |
| 3,504,980 | 4/1970 | Bentley | 356/177 |

Primary Examiner—James W. Lawrence
Assistant Examiner—D. C. Nelms
Attorney—Harry M. Saragovitz, Edward J. Kelly et al.

[57] ABSTRACT

An instrument for determining the individual proportions of specific colors within the visual spectrum which includes sensing means for each color to provide an electrical analog of the color energy/bandwidth. The sensing means comprises for each spectrum, one or more photocells each coupled with an appropriate transmission filter. These photocell-filter combinations are selected to cover uniform portions of the spectrum to provide weighted equal responses for selected color bands across the entire visual spectrum. The outputs of these combinations are summed to give the total spectrum output as well as being individually applied to separate divider circuits that also receive the summed total and provide a ratio voltage output signal. This latter signal from each divider is fed into a separate input of a chart recorder where the continuous percentage value of each color is simultaneously recorded.

8 Claims, 3 Drawing Figures

INVENTOR.
CHESTER L. SMITH
LOUIS R. SZABO
BY Harry M. Saragovitz,
Edward J. Kelly, Herbert Berl
Ernest J. Weinberger

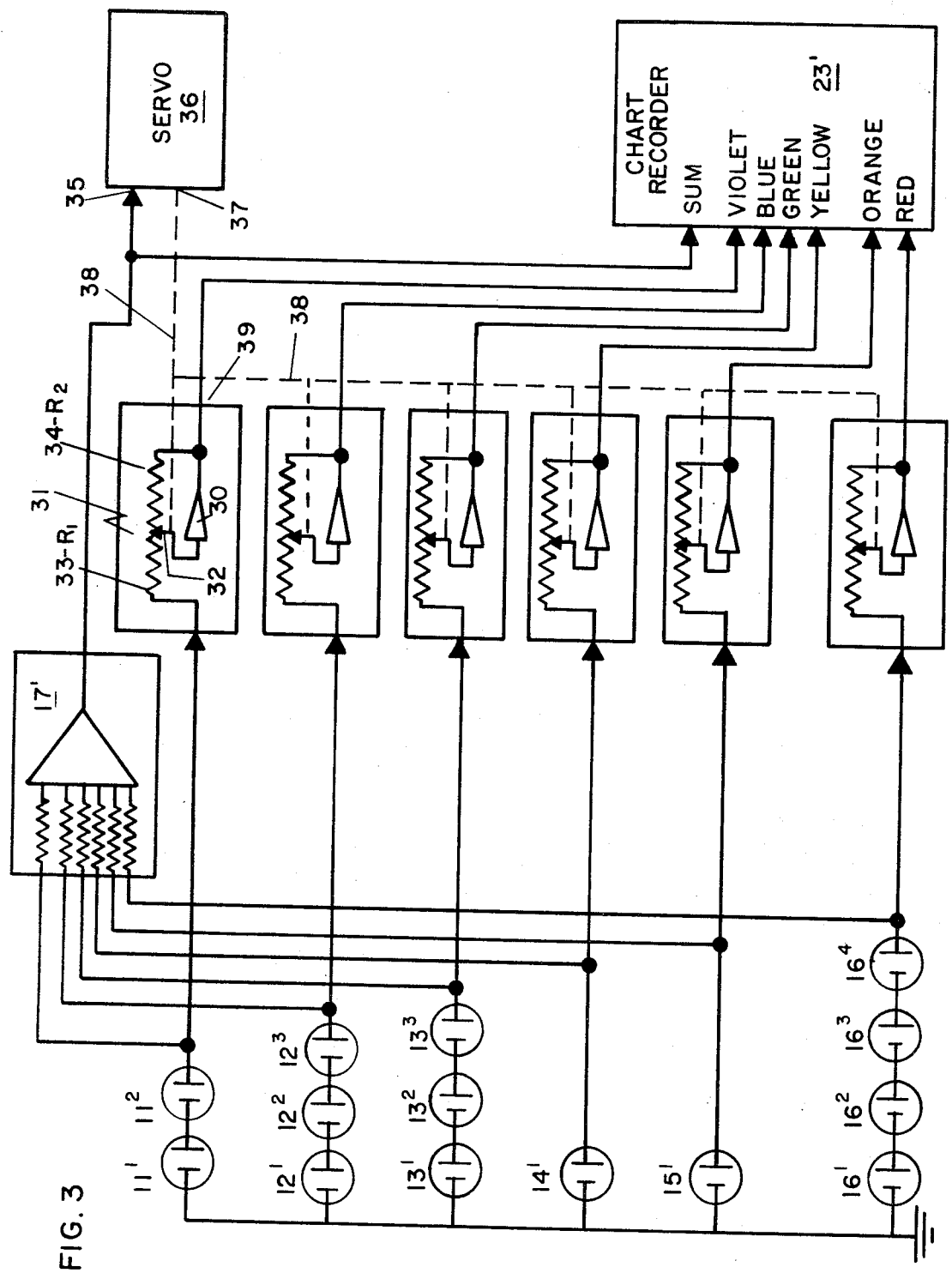

FLAME COLOR SIGNATURE APPARATUS

The invention described herein may be manufactured, used and licensed by or for the Government for governmental purposes without the payment to us of any royalty thereon.

BACKGROUND OF THE INVENTION

The present invention relates to instruments for measuring the spectral weighted values of a light source and more particularly pertains to an apparatus for continuously recording and determining the color signature or percentage values of selected individual colors present in a light source.

In the field of color measurements, it has been the general practice to employ the standard color method and the Flare Radiometer to perform these evaluations. Such devices, including the method, have been unsatisfactory in that the radiometer determines the relative intensity of the source versus wave length and to calculate the color ratios therefrom necessitates an extensive number of calculations. For example, a flare or source that emits for five minutes with a radiometer scan rate of one cycle per second, will require approximately 3,000 values and tedious numerical manipulations. The instant invention overcomes these difficulties and fills the need of a color evaluator.

SUMMARY OF THE INVENTION

The general purpose of this invention is to provide an instrument for determining the percentage or proportion of color content of a light source, which instrument has all the advantages of similarly employed prior art devices and has none of the above described disadvantages. To attain this, the present invention provides a unique combination and arrangement wherein the light emanating from a light source, such as a flare, is simultaneously sensed by a series of photocell-filter units each covering a specific uniform individual color spectrum. The voltage analogs thereof are weighted and is applied to a summing means whose totalized output is fed into one input of each of a plurality of voltage divider networks. The other input to the divider networks includes one of the weighted analog signals from the sensors so that each divider output is effectively the ratio of that color to the total or summed source energy. These proportioned output signals are subsequently applied to separate inputs of a chart recorder where these values as well as the totalized signal are traced to provide a permanent visual indication.

An object of the present invention is to provide a simple, non-cyclic, reliable, accurate, inexpensive and readily operable instrument for the measurement of the energy per bandwidth ratio a selected color bears to the total of the light source.

Another object is to provide an apparatus for determining the color signature of a light source which is independent of the source intensity and capable of continuously producing data for each of a selected number of different color spectrums.

A further object is the provision of an instrument for ascertaining color signature which is self-checking to indicate malfunction, is readily calibrated with a standard lamp and retains the calibration for extended periods of time and does not require the services of one skilled in the art.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
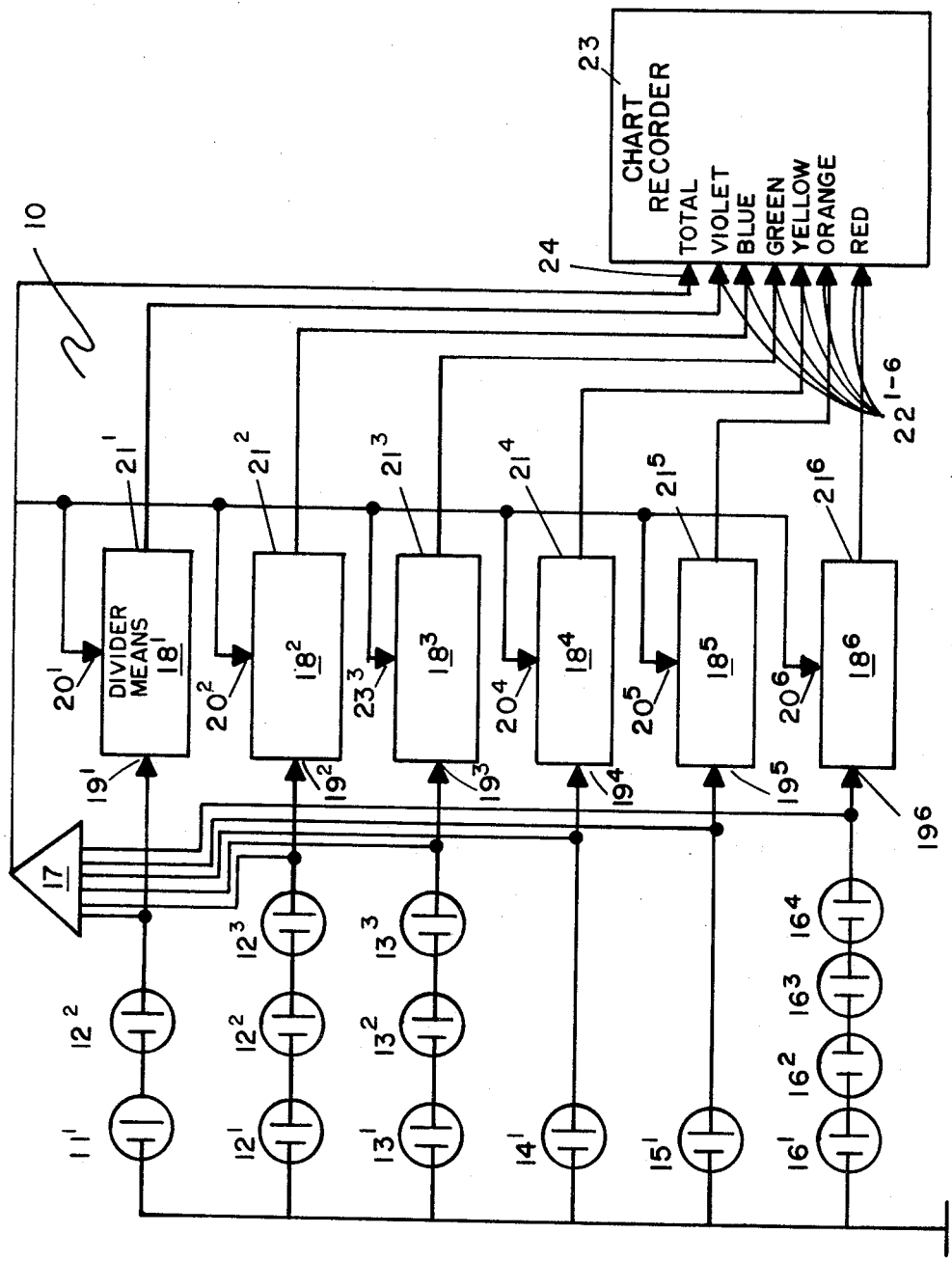
FIG. 1 is a block diagram representing an embodiment made in accordance with the principle of the invention.
Figure 2:
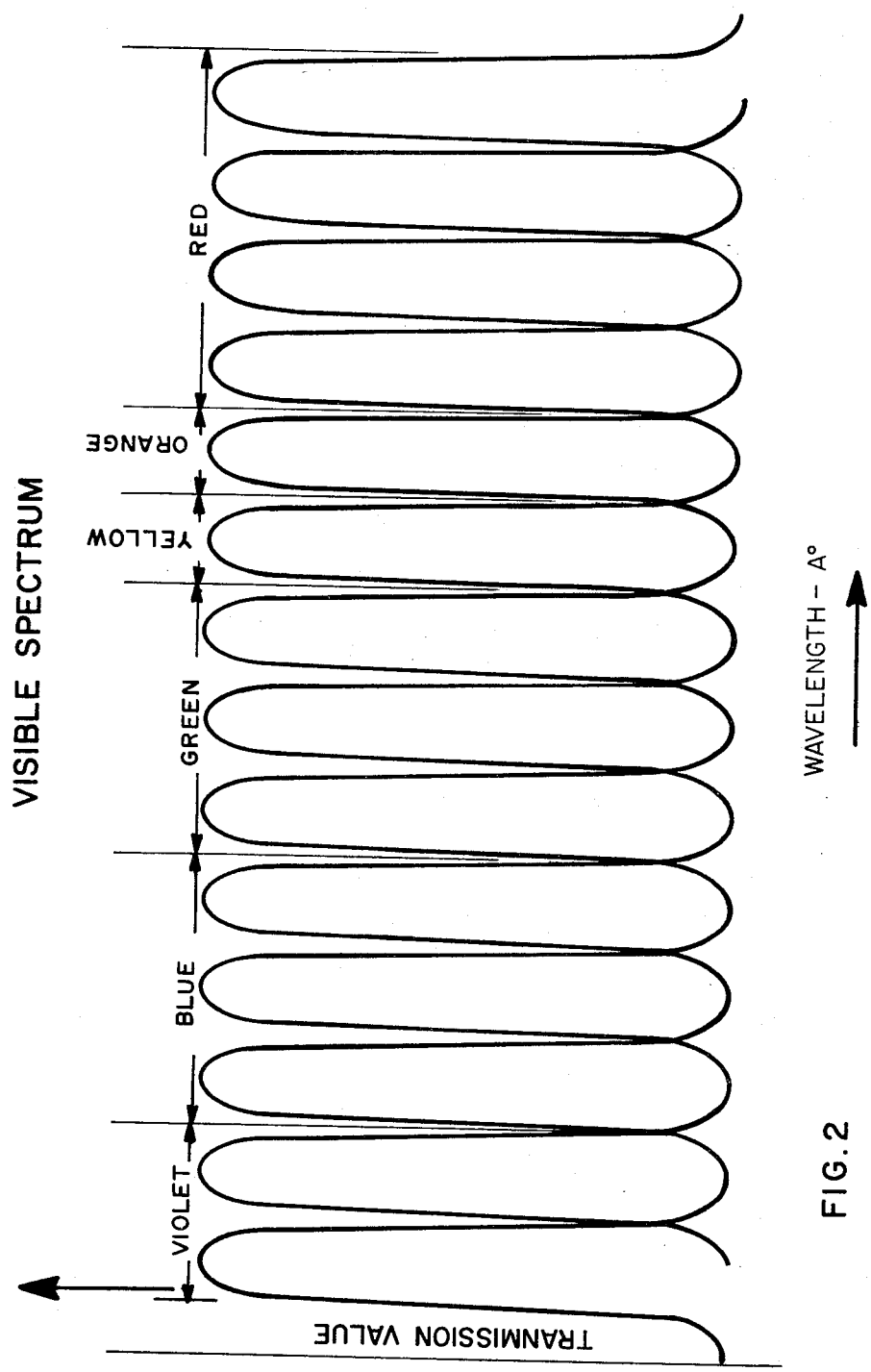
FIG. 2 is a graphical representation of the filter transmission of the photocell-filter combination; and, FIG. 3 is a detailed block diagram of another embodiment.

In the illustrated embodiment of FIG. 1, the color signature instrument 10 comprises a plurality of separate input or sensor channels each of which includes at least one photocell, e.g. photovoltaic or photoelectric cell in combination with an appropriate transmission filter, designated as 11 through 16. In order that the instrument be capable of covering the entire spectrum, the spectrum was divided into specific equal bandwidths as shown in FIG. 2 so that each sensor combination operates over the same bandwidth and provides an overall uniform response. The number of sensors employed is dependent on the subdivision determined by the filter transmission curves. The filters are selected or fabricated in accordance with the required frequency response and matched to the photocell and are chosen to cover the desired portion of the visible spectrum in a uniform manner wherein:

$$\int_0^\infty F_1(\lambda)d\lambda = \int_0^\infty F_2(\lambda)d\lambda \ldots = \int_0^\infty F_n(\lambda)d\lambda \quad (1)$$

where $F_n(\lambda)$ is the photocell-filter response of the $n^{th}$ combination. The output of each channel when detecting the light of an unknown source $Z(\lambda)$ is:

$$S_n = \int_0^\infty Z(\lambda)F_n(\lambda)d\lambda$$

If the source is spectrally uniform in its radiated energy then $$S_n = K\int_0^\infty F_n(\lambda)d\lambda$$

and since the integrals of equation (1) are all equal then $$S_1 = S_2 = S_3 \ldots = S_n$$

In view of the fact that the spectral colors have differing bandwidths the number of sensor combinations used to cover these bands are selected as follows:

$S_1 + S_2$ = violet
$S_3 + S_4 + S_5$ = blue
$S_6 + S_7 + S_8$ = green
$S_9$ = yellow
$S_{10}$ = orange
$S_{11} + S_{12} + S_{13} + S_{14}$ = red The weighted electrical outputs of the photocell-filters for each channel are simultaneously applied to the inputs of a summing operational amplifier 17 which may be a Model 145 manufactured by the Zeltex Corporation while a suitable photosensor includes a S 2900

GE9.5 M manufactured by the International Rectifier Corporation. Each of the channel outputs is also fed into one of a plurality of individual ratio or divider means 18 via one of its input terminals 19. Satisfactory results have been obtained by simply connecting-up a Model AD 426 manufactured by Analog Devices Corporation to provide division. The other input 20 of each divider means 18 receives the summed or totalized output from the summing amplifier 17. The respective outputs 21 of the divider means are connected to individual inputs 22 of a chart recorder 23, as for example, a Model 906C Visicorder, manufactured by Minneapolis Honeywell. Another chart recorder input 24 receives and records the summed total signal from the summing amplifier.

The six detected and transduced signals from the photocell-filters 11–16 representing each individual color are fed into separate divider means therein divided by the totalized output of all the cell combinations. The output electrical signal is essentially an analog of the ratio of the individual color to the total visible spectrum. These ratio signals are then presented to the chart recorder and continuously recorded thereby to provide a running record of the ratios during observation of the light source.

FIG. 3 represents another embodiment of the invention in accordance with the basic principle underlying the invention wherein the sensing and summing portions as well as the chart recorder remain equivalent to that disclosed for the previously described embodiment. In place of the fully electrical form of divider means, there is substituted in combination an operational type amplifier 30 which includes an input resistive portion and a feedback resistance loop 34. The resistors have been integrated so as to permit the employment of a potentiometer 31 whose movable arm or pole 32 divides the input 33 and the feedback 34 resistors. The output of summer 17' is applied to the electrical input 35 of the servomechanism 36 whose rotary mechanical output at 37 is linked or coupled via 38 to each of the poles 32 of potentiometers 31.

The equivalent circuit considered is

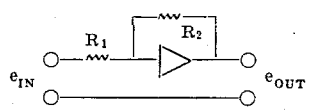

then $$e_o = (R_2/R_1)e_{in}$$

and therefore the output signal $e_o$ is proportional to the input $e_{in}$ by a factor of the resistances which in reality is the setting of the potentiometer as determined by the summed input to the servomechanism. Thus, it is clear, that when all the potentiometers are of equal value and setting, then the operational amplifier output at 39 is effectively the ratio or proportion of the input to the totalized signal. The servo mechanism displaces the potentiometers in accordance with the summed or totalized color signal. These ratioed outputs are presented and recorded on the chart recorder 23'. The output appears as a trace on a recorder having a scale of 0 to 100 to represent percentage values and therefore they must always add up to 100 thus providing a continuous and immediate indication of whether the instrument is functioning properly. The instrument may be readily calibrated by any source of known spectral distribution as for example, a standard lamp at a color temperature of 2,854°K. As is the general case, the photocell's output is developed across an internal, variable resistance and produces thereacross the standard lamp's black body functions. Thus, it is merely necessary to adjust the resistance thereof to correct for the photocell-filter response to achieve a uniform sensing over the entire visible spectrum or the physical equivalent of the instruments viewing a uniform source wherein each wavelength is equally weighted.

It should be understood, of course, that the foregoing disclosure relates to only preferred embodiments of the invention and that numerous modifications or alterations may be made therein without departing from the spirit and scope of the invention as set forth in the appended claims.

We claim:

1. An instrument for determining the individual proportions of selected color bands of a light source, which comprises:
   a channel for each selected color band which includes in series therein
      photosensor means for providing a weighted electrical analog of the respective individual color band of said source;
      ratio/divider means, having an electrical input connected to receive the analog output of said sensor means, for providing an electrical output which is the ratio of said one input to that of a second input, and having said electrical output appled to one input of a
   plural input indicating means, and
   summing means for providing at said second input the summed totalized value of all of said weighted analog outputs of said sensor means;
   whereby said indicating means will display simultaneously and continuously the individual proportions of said weighted analogs of said selected color bands.

2. The instrument according to claim 1 wherein said sensor means are selected photocell transmission filter combinations.

3. The instrument according to claim 2 wherein said indicating means is a chart recorder.

4. The instrument according to claim 1 wherein said summing means is an operational summing amplifier also having its output connected to an input of said indicating means.

5. The instrument according to claim 1 wherein said summing means includes
   a summing amplifier connected to receive and sum said weighted analog outputs and having its output connected to
   the electrical input of an electrical to mechanical servomechanism for providing at its mechanical output an analog of the summed weighted analogs.

6. The instrument according to claim 5 wherein said ratio/divider means includes
   an operational amplifier,
   a variable resistor having a movable pole connected to the input of said operational amplifier and one fixed terminal thereof connected to the output of said operational amplifier and the other fixed terminal connected to receive said weighted analog, mechanical linkage means connected intermediate said pole and said mechanical output for varying said resistor in accordance with said summed value through said servomechanism.

7. The instrument according to claim 1 wherein said electrical analogs are weighted in the following proportions; yellow and orange:1, violet:2, green and blue:3, and red:4.

8. The instrument according to claim 2, wherein said electrical analogs are weighted by including selected numbers of said photocell-transmission filter combinations in said channels in the following proportions; yellow and orange: 1, violet: 2, green and blue: 3, and red: 4.

* * * * *